Nov. 4, 1924.　　　　　　　　　　　　　　　　1,514,396
R. E. POULEY ET AL
VENTILATOR
Filed May 5, 1924　　　　2 Sheets-Sheet 1

Witnesses:

Inventors:
Robert E. Pouley &
Milton C. Hartman
By Joshua R. H. Potts
Their Attorney.

Patented Nov. 4, 1924.

1,514,396

UNITED STATES PATENT OFFICE.

ROBERT E. POULEY AND MILTON C. HARTMAN, OF CHICAGO, ILLINOIS.

VENTILATOR.

Application filed May 5, 1924. Serial No. 710,997.

*To all whom it may concern:*

Be it known that we, ROBERT E. POULEY and MILTON C. HARTMAN, citizens of the United States, and residents of the city of Chicago, county of Cook, and State of Illinois, respectively, have invented certain new and useful Improvements in Ventilators, of which the following is a specification.

Our invention relates to improvements in ventilators, especially adapted for use in theatres and the like, the object of the invention being to provide a simple construction of this character which is highly efficient in use.

Other objects will appear hereinafter.

The invention consists in the combinations and arrangements of parts hereinafter described and claimed.

The invention will be best understood by reference to the accompanying drawings forming a part of this specification, and in which—

Figure 1:
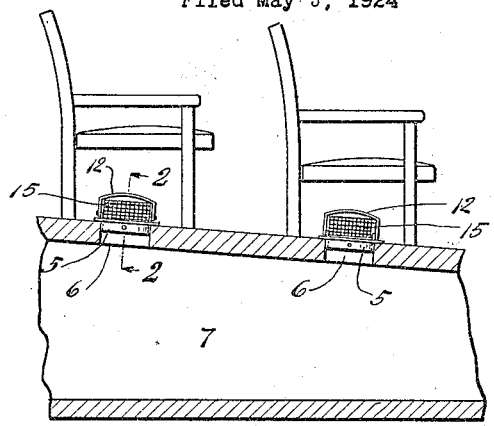
Figure 2:
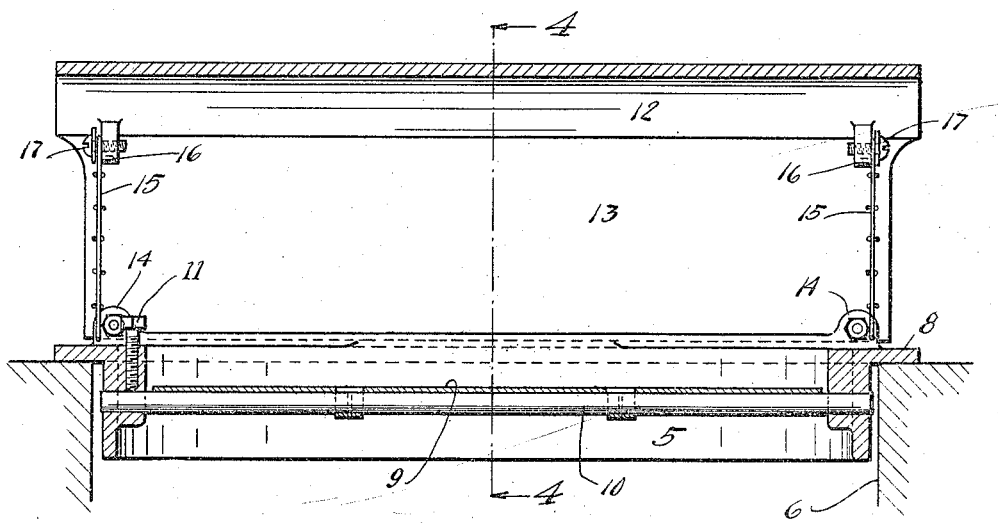
Figure 3:
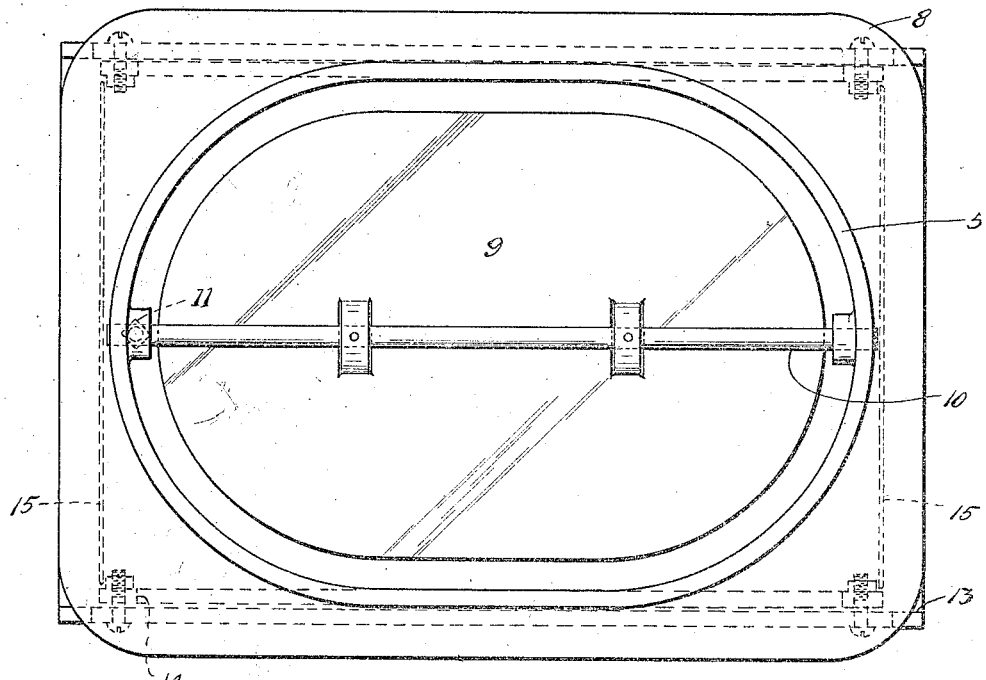

Fig. 1 is a view illustrating a plurality of ventilators in position for use;

Fig. 2, an enlarged section taken on line 2—2 of Fig. 1;

Fig. 3, a bottom plan view corresponding with Fig. 2, and

Figure 4:
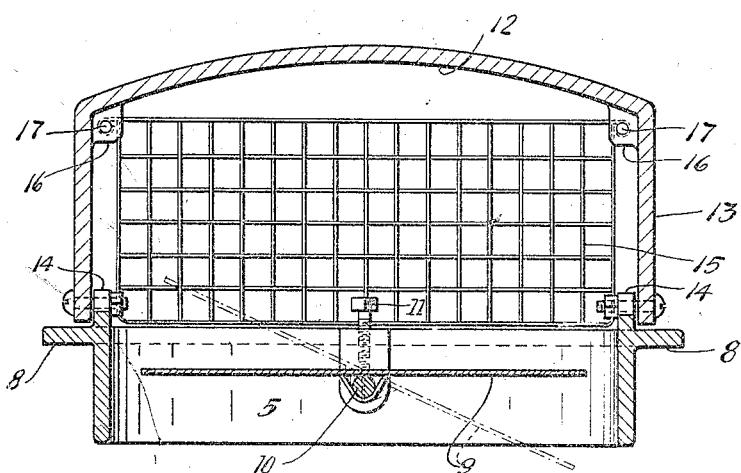

Fig. 4, a section taken on line 4—4 of Fig. 2.

The preferred form of construction as illustrated in the drawings comprises a supporting rim 5 adapted and arranged within the usual air openings 6 leading upwardly from the usual ventilating air duct 7 arranged under the floor of a theatre or the like, said air openings leading upwardly through the floor under the seats as shown. The supporting rim 5 is provided with a supporting flange 8 resting on the floor and a damper 9 is pivotally mounted in said supporting rim being secured to a supporting shaft 10 journalled at its ends in the rim. A set screw 11 is provided in the rim 5 at one end of shaft 10 and serves to lock the damper 9 in adjusted position so as to control the passage of air from the air duct 7.

A ventilator housing is arranged over the support 5, the ventilating housing comprising a closed top 12 and depending front and rear walls 13 secured to lugs 14 on supporting rim 5 by means of bolts as shown. Gratings 15 are secured to lugs 16 by means of screw bolts 17 and permit of the ready escape of air from the housing but prevent trash, such as peanut shells and the like from entering the air openings.

In use ventilators are arranged at intervals under the seats and in open communication with the air ducts below the floor. By adjusting the dampers 9 mounted in the ventilators air escaping from the air ducts may be regulated as desired. Owing to the fact that the top, front and rear walls of the housings are closed no direct drafts will be projected onto the occupants of the seats, the incoming fresh air being diverted laterally under the seats.

While we have illustrated and described the preferred form of construction for carrying our invention into effect, this is capable of variation and modification without departing from the spirit of the invention. We, therefore, do not wish to be limited to the precise details of construction set forth, but desire to avail ourselves of such variations and modifications as come within the scope of the appended claims.

Having described our invention, what we claim as new and desire to secure by Letters Patent is:

1. The combination with a seat having an air opening in the floor thereunder, of a ventilator therefor in the form of a rim fitting into said opening and provided with a flange resting on the floor; lugs on the top of said rim; a housing having a closed top and depending front and rear walls arranged over said rim, the lower ends of said walls being secured to said lugs, the sides of said housing being open; a grating arranged across each open side of said housing; a shaft rotatably mounted in said rim and traversing the floor opening; a damper secured to said shaft and arranged in said opening; and a set screw in said rim engaging said shaft, substantially as described.

2. The combination with a seat having an air opening in the floor thereunder, of a ventilator therefor in the form of a rim fitting into said opening and provided with a flange resting on the floor; upstanding lugs on said rim; a housing having a closed top and depending front and rear walls secured to said lugs, the sides of said housing being open; depending lugs on the top of said housing within the open side thereof; gratings secured to said depending lugs and arranged across the open sides of said housing; a ventilator shaft rotatably mounted in said rim and traversing the floor opening; a damper secured to said shaft and arranged in said opening; and a set screw in said rim engaging said shaft, substantially as described.

In testimony whereof we have signed our names to this specification in the presence of two subscribing witnesses.

ROBERT E. POULEY.
MILTON C. HARTMAN.

Witnesses:
  JOSHUA R. H. POTTS,
  MARGARET AUER.